United States Patent
Cellier et al.

(10) Patent No.: US 10,169,516 B2
(45) Date of Patent: Jan. 1, 2019

(54) METHODS AND COMPUTER PROGRAM PRODUCTS FOR VIA CAPACITANCE EXTRACTION

(71) Applicant: International Business Machines Corporation, Armonk, NY (US)

(72) Inventors: Susan E. Cellier, Hopewell Junction, NY (US); Lewis W. Dewey, III, Wappingers Falls, NY (US); Anthony D. Hagin, Poughkeepsie, NY (US); Adam P. Matheny, Beacon, NY (US); Ronald D. Rose, Essex Junction, VT (US); David J. Widiger, Pflugerville, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 442 days.

(21) Appl. No.: 14/964,863

(22) Filed: Dec. 10, 2015

(65) Prior Publication Data

US 2017/0169151 A1    Jun. 15, 2017

(51) Int. Cl.
G06F 17/50    (2006.01)

(52) U.S. Cl.
CPC ...... *G06F 17/5072* (2013.01); *G06F 17/5036* (2013.01); *G06F 17/5068* (2013.01); *G06F 2217/82* (2013.01)

(58) Field of Classification Search
CPC .......................... G06F 17/5045; G06F 17/5072

(Continued)

(56) References Cited

U.S. PATENT DOCUMENTS

| 5,452,224 A | 9/1995 | Smith, Jr. et al. |
| 5,907,824 A | 5/1999 | Tzirkel-Hancock |

(Continued)

OTHER PUBLICATIONS

Zhang et al.; "Fast Random Walk Based Capacitance Extraction for the 3D IC Structures with Cylindrical Inter-Tier-Vias"; IEEE Transactions on Computer-Aided Design of Integrated Circuits and Systems, CAD 0.1109/TCAD.2015.2440323; 2015, pp. 1-14.

(Continued)

*Primary Examiner* — Jack Chiang
*Assistant Examiner* — Brandon Bowers
(74) *Attorney, Agent, or Firm* — Cantor Colburn LLP; Jennifer Anda (57) ABSTRACT

Embodiments include methods, processing systems and computer program products for extracting via capacitance. Aspects include placing various shapes of target nets of an IC into a Cshapes collection and a CshapesVia collection, processing the shapes in these collections and placing the processed shapes into a Ctile collection and a CtilesVia collection, and extracting via capacitance of the target nets through each of Cshapes, CshapesVia, Ctiles, and CtilesVia collections. In exemplary embodiments, the processing operation includes: reducing the complexity of the shapes in the shape collections, removing all overhang shapes, and all overlapped shapes from the shape collections, and unioning the shapes in the Cshapes collection and the CshapesVia collection, respectively. Unioning operation includes: unioning shapes from Cshapes collection into a non-overlapping Ctiles collection, unioning shapes from CshapesVia collection into a non-overlapping CtileVia collection, computing the tile intersections of Cshapes collection and CshapesVia collection, and removing intersections from CshapesVia collection.

20 Claims, 5 Drawing Sheets

(58) Field of Classification Search
USPC .......................................................... 716/103
See application file for complete search history.

(56) References Cited

U.S. PATENT DOCUMENTS

| | | |
|---|---|---|
| 6,061,508 A | 5/2000 | Mehrotra et al. |
| 6,086,238 A | 7/2000 | Mehrotra et al. |
| 6,381,730 B1 * | 4/2002 | Chang .................. G06F 17/5036 716/115 |
| 6,460,167 B1 | 10/2002 | Dewey, III et al. |
| 6,542,834 B1 | 4/2003 | Dixit |
| 6,574,782 B1 | 6/2003 | Dewey, III et al. |
| 6,816,999 B2 | 11/2004 | Lee |
| 7,047,175 B1 | 5/2006 | Jain et al. |
| 8,074,189 B2 | 12/2011 | McConaghy et al. |
| 8,365,103 B1 | 1/2013 | Gennari et al. |
| 8,572,537 B2 | 10/2013 | Su et al. |
| 8,799,842 B2 | 8/2014 | Tutuianu et al. |
| 2011/0078642 A1 | 3/2011 | Elfadel et al. |
| 2015/0089465 A1 | 3/2015 | Chang et al. |
| 2015/0135148 A1 | 5/2015 | Caldwell et al. |

OTHER PUBLICATIONS

Zhicai et al.; "Principle and Applications of Segmented Modeling Method of via"; Antennas, Propagation & EM Theory (ISAPE); IEEE, 2012; pp. 710-713.

Zhu et al.; "An Analytic Method for Capacitance Extraction of Asymmetric Vias"; IEEE Microwave and Wireless components Letters; vol. 25; No. 5; May 2015; pp. 280-282.

* cited by examiner

METHODS AND COMPUTER PROGRAM PRODUCTS FOR VIA CAPACITANCE EXTRACTION

BACKGROUND

The present disclosure relates generally to integrated circuit design, and more particularly to methods and computer program products for improving shape processing and reducing analysis time of via capacitance extraction.

As very large scale integrated circuit (VLSI) chips have increased size and complexity over the decades, interconnect width and spacing has also scaled. If the VLSI chip is not properly designed, the performance of the IC chip designed may be limited because of certain parasitic characteristics of the IC chip, and interactions between the components and conducting wires that are so close in space. Crosstalk can also limit the performance and function of the IC chip. Therefore, the effects of the interactions and crosstalk cannot be ignored, and must be accurately estimated.

In electronic design automation (or EDA), parasitic extraction is performed in order to "extract" electrical characteristics of a physical layout of an integrated circuit (IC). Parasitic extraction is calculation of the parasitic effects in both the designed devices and the required wiring interconnects (also generally referred to as "nets") of the IC. The common electrical characteristics that are extracted from the physical layout of the IC include capacitance and resistance in the electronic devices within the IC and on the various nets that electrically connect the aforementioned electronic devices. These capacitance and resistance values are not intended by the designer but rather result from the underlying device physics of the device configurations and materials used to fabricate the IC. These unintended capacitance and resistance values may cause the performance of the IC to deteriorate. Therefore, an accurate estimation of the parasitic elements composing the nets is crucial for understanding the performance of the ICs, and to create an accurate analog model of the circuit before they are manufactured, so that detailed simulations can emulate actual digital and analog circuit responses and ascertain that the extra extracted parasitics will still allow the designed IC to function properly as designed.

An extractor tool is used to perform the parasitic extraction. The parasitic capacitance is calculated by giving the extraction tool the top view layout of the design in the form of input polygons on a set of layers; a mapping to a set of devices and pins (from a Layout Versus Schematic run), and a cross sectional understanding of these layers. This information is used to create a set of layout wires that have added capacitors where the input polygons and cross sectional structure indicate. The extraction tool acts on global nets, the set of shapes that constitute the chip's cell to cell connections. Global nets will have very large number of nets and shapes making up the nets, making it very difficult to hold all in memory, and is often very compute-intensive to analyze. For example, an extraction of a large flat core can take many hours, sometime, more than 12 hours. It is desirable to have a processing method to extract the parasitic capacitance without sacrificing the accuracy.

Therefore, heretofore unaddressed needs still exist in the art to address the aforementioned deficiencies and inadequacies.

SUMMARY

In one aspect, the present disclosure relates to a method for extracting via capacitance. In certain embodiments, the method includes: placing various shapes of target nets of an IC into a Cshapes collection and placing various via pad shapes of the target nets into a CshapesVia collection, processing the shapes in the Cshapes collection and placing the processed shapes into a Ctile collection, and processing the via pad shapes in the CshapesVia collection and placing the processed shapes into a CtilesVia collection, and extracting via capacitance of the plurality of target nets through each of the Cshapes collection, the CshapesVia collection, the Ctiles collection, and the CtilesVia collection. Each of the via pads has a first via pad shape, and a second via pad shape.

In exemplary embodiments, the processing operation includes: reducing the complexity of the shapes in the Cshapes collection and the CshapesVia collection, removing the shapes that will not contribute the results of via capacitance from the Cshapes collection and the CshapesVia collection, and unioning the shapes in the Cshapes collection and the CshapesVia collection, respectively. The unioning operation includes: unioning the shapes from the Cshapes collection into a non-overlapping Ctiles collection, unioning the shapes from the CshapesVia collection into a non-overlapping CtileVia collection, computing the tile intersections of the Cshapes collection and the CshapesVia collection, and removing the intersections from the CshapesVia collection.

In another aspect, the present disclosure relates to a processing system for extracting via capacitance. In exemplary embodiments, the processing system includes a processor in communication with one or more types of memory. The processor is configured to: place various shapes of target nets of an IC into a Cshapes collection and place various via pad shapes of the target nets into a CshapesVia collection, process the shapes in the Cshapes collection and place the processed shapes into a Ctile collection, and process the via pad shapes in the CshapesVia collection and place the processed shapes into a CtilesVia collection, and extract via capacitance of the target nets through each of the Cshapes collection, the CshapesVia collection, the Ctiles collection, and the CtilesVia collection.

In yet another aspect, the present disclosure relates to a computer program product for extracting via capacitance. In exemplary embodiments, the computer program product includes a non-transitory storage medium readable by a processing circuit and storing computer executable instructions for execution by the processing circuit for performing a method of extracting via capacitance. The method includes: placing various shapes of target nets of an IC into a Cshapes collection and placing various via pad shapes of the target nets into a CshapesVia collection, processing the shapes in the Cshapes collection and placing the processed shapes into a Ctile collection, and processing the via pad shapes in the CshapesVia collection and placing the processed shapes into a CtilesVia collection, and extracting via capacitance of the plurality of target nets through each of the Cshapes collection, the CshapesVia collection, the Ctiles collection, and the CtilesVia collection.

These and other aspects of the present disclosure will become apparent from the following description of the preferred embodiment taken in conjunction with the following drawings and their captions, although variations and modifications therein may be affected without departing from the spirit and scope of the novel concepts of the disclosure.

BRIEF DESCRIPTION OF THE DRAWINGS

The subject matter which is regarded as the invention is particularly pointed out and distinctly claimed in the claims at the conclusion of the specification. The foregoing and other features and advantages of the invention are apparent from the following detailed description taken in conjunction with the accompanying drawings in which:

DETAILED DESCRIPTION

The present disclosure is more particularly described in the following examples that are intended as illustrative only since numerous modifications and variations therein will be apparent to those skilled in the art. Various embodiments of the disclosure are now described in detail. Referring to the drawings, like numbers, if any, indicate like components throughout the views. As used in the description herein and throughout the claims that follow, the meaning of "a", "an", and "the" includes plural reference unless the context clearly dictates otherwise. Also, as used in the description herein and throughout the claims that follow, the meaning of "in" includes "in" and "on" unless the context clearly dictates otherwise. Moreover, titles or subtitles may be used in the specification for the convenience of a reader, which shall have no influence on the scope of the present disclosure. Additionally, some terms used in this specification are more specifically defined below.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. It will be appreciated that same thing can be said in more than one way. Consequently, alternative language and synonyms may be used for any one or more of the terms discussed herein, nor is any special significance to be placed upon whether or not a term is elaborated or discussed herein. The use of examples anywhere in this specification including examples of any terms discussed herein is illustrative only, and in no way limits the scope and meaning of the disclosure or of any exemplified term. Likewise, the disclosure is not limited to various embodiments given in this specification.

Unless otherwise defined, all technical and scientific terms used herein have the same meaning as commonly understood by one of ordinary skill in the art to which this disclosure pertains. In the case of conflict, the present document, including definitions will control.

As used herein, "plurality" means two or more. The terms "comprising," "including," "carrying," "having," "containing," "involving," and the like are to be understood to be open-ended, i.e., to mean including but not limited to.

The term computer program, as used above, may include software, firmware, and/or microcode, and may refer to programs, routines, functions, classes, and/or objects. The term shared, as used above, means that some or all code from multiple modules may be executed using a single (shared) processor.

The terms "Cshapes", "CshapesVia", "Ctiles", and "CtilesVia" are used herein to identify, label, and collect shapes of different types into collections. Cshapes is a collection of a wire's physical shapes. Similarly, for each via pad shape in Cshapes, if the via's cut shapes are already covered by a target net, this shape is added into a separate collection: CshapesVia. Ctiles is a collection of tiles, which are created by unioning the shapes from Cshapes, such that each tile consists of shapes that are nonoverlapping with the shapes of other tiles. CtilesVia is a collection of via shapes which include the union of shapes from CShapesVia split into separate collections of nonoverlapping tiles.

The apparatuses and methods described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

The present disclosure will now be described more fully hereinafter with reference to the accompanying drawings, in which embodiments of the disclosure are shown. This disclosure may, however, be embodied in many different forms and should not be construed as limited to the embodiments set forth herein; rather, these embodiments are provided so that this disclosure will be thorough and complete, and will fully convey the scope of the disclosure to those skilled in the art.

Disclosed herein are methods and computer program products for improving shape processing and reducing analysis time of via capacitance extraction. In exemplary embodiments, the methods utilize the observation that via metal pad overhang increases the tile fracturing count when unioning the shapes of a target net into non-overlapping tiles. These overhangs are often relatively small and contribute little to the overall topology for the routed net.

As described in earlier sections, an extractor tool is used to perform via capacitance extraction. The via capacitance is calculated by giving the extraction tool the top view layout of the design in the form of input polygons on a set of layers; a mapping to a set of devices and pins (from a Layout Versus Schematic run), and a cross sectional understanding of these layers. This information is used to create a set of layout wires that have added capacitors where the input polygons and cross sectional structure indicate. The extraction tool acts on global nets, the set of shapes that constitute the chips cell to cell connections. Depending on the complexity of the IC circuit, and the shapes of the nets, the global nets may have very large number of nets and shapes making up the nets. The computation time is directly proportional to the number of nets, and the shapes of the nets. Therefore, via capacitance extraction may require high performance computer with large memory, and computation power, and very long time to process. It is desirable to simplify the shapes, and remove the shapes that do not affect the via capacitance results prior to the via capacitance extraction.

Capacitance extraction tool calculates via capacitance according to the layout of metal conductors and vias in a designed IC chip. The layout of metal conductors and vias are formed in various shapes: such as a triangle, a square, a rectangle, a circle, an oval, or a polygon. The more complicated the shapes become, the more time it takes to extract the via capacitance. In certain embodiments, the extraction tool places various shapes in different collections. For example: conductor shapes are placed in a Cshapes collection, and via pad shapes are placed in a CshapesVia collection. The shape collections are processed and further placed in tile collections. For example: various shapes in the Cshapes collection can be unionized and placed in a Ctiles collection, and various via pad shapes in the CshapesVia collection may be unionized and placed in a CtilesVia collection.

In one aspect, the present disclosure relates to methods for improving shape processing and reducing analysis time of via capacitance extraction. In exemplary embodiments, the method 100 can be executed by a processing system such as a general purpose computer. The processing system is configured to receive the layout of the IC design in the form of input polygons on a set of layers, a mapping to a set of devices and pins, and a cross sectional understanding of these layers, process these shapes and layers to reduce the total number of shapes, and the complexity of the shapes, and extract via capacitance of the IC based on the reduced number and complexity of the shapes. The shape collection may include shapes in a shape collection: Cshapes and a via shape collection: CshapesVia. The tile collection may include conductor tiles in a tile collection: Ctiles and a via tile collection: CtilesVia.

Figure 1:
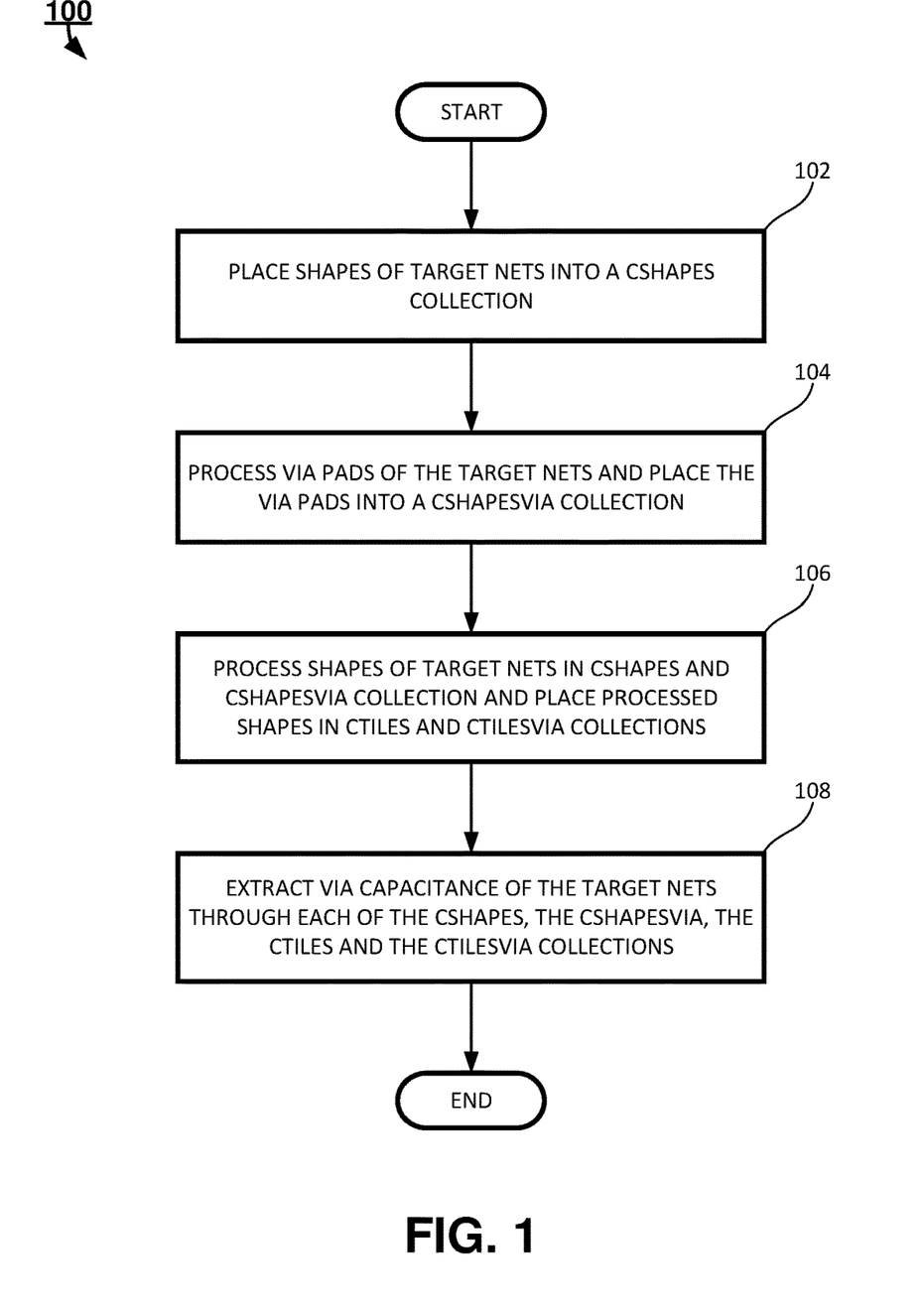
FIG. 1 is a flow diagram of a method of extracting via capacitance in accordance with certain exemplary embodiments.

Referring to FIG. 1, a flow diagram of a method 100 of extracting via capacitance using an extraction tool is shown in accordance with certain exemplary embodiments of present disclosure. As shown at block 102, after the extraction tool receives the shapes of target nets, the method 100 includes placing various shapes of target nets of an IC into a Cshapes collection.

Next, as shown at block 104, the method 100 includes processing various via pads of the target nets and placing the via pad shapes in a CshapeVia collection. Each of the via pads has a first via pad shape, and a second via pad shape. In certain embodiments, the processing operation includes: excluding each of the second via pad shape of the via pad shapes from the Cshapes collection when the via's cut shapes are already covered by the target nets, and adding the excluded second via pad shape into the CshapesVia collection.

Continuing with reference to FIG. 1, the method 100 also includes processing the shapes of the target nets in Cshapes collection and place the processed shapes into a Ctile collection; and processing various via pad shapes in the CshapesVia collection and placing the processed via pad shapes in CtilesVia collection, respectively. In exemplary embodiments, the processing operation includes simplifying the shapes in the Cshapes collection, and the via pad shapes in the CshapesVia collection, respectively. The simplifying operation includes: reducing the complexity of the shapes in the Cshapes collection and the via pad shapes in the CshapesVia collection, removing the shapes that will not contribute the results of via capacitance from the Cshapes collection and the CshapesVia collection, and unioning the shapes in the Cshapes collection and the CshapesVia collection, respectively. The reducing the complexity of the shapes in the Cshapes collection and the CshapesVia collection will be described in detail in conjunction with the accompanying drawings FIGS. 2-4.

In certain embodiments, the removing operation includes: removing all overhang shapes from each of the Cshapes collection and the CshapesVia collection, and removing all overlapped shapes from each of the Cshapes collection and the CshapesVia collection. The unioning operation includes: unioning the shapes from the Cshapes collection into a non-overlapping Ctiles collection, unioning the via pad shapes from the CshapesVia collection into a non-overlapping CtileVia collection, computing the tile intersections of the Cshapes collection and the CshapesVia collection, and removing the intersections from the CshapesVia collection.

The method 100 also includes extracting via capacitance of the target nets through each of the Cshapes collection, the CshapesVia collection, the Ctiles collection, and the CtileVia collection as shown at block 108. In exemplary embodiments, the extracting operation includes: extracting via capacitance from each of the shapes in the Cshapes collection, the CshapesVia collection, and the Ctiles collection, performing a fast 2D via capacitance extraction for each tile in the CtilesVia collection, and adding the extracted capacitance to the corresponding tile capacitance in Ctiles collection.

Referring now to FIGS. 2-5, various examples of reducing the total number of shapes and complexity of the shapes are shown in accordance with certain exemplary embodiments of the present disclosure. The performance of the extraction tool is a function of the number of shapes making up the wires, and of their proximity and electrical interaction with other shapes in the neighborhood. As more shapes characteristics interact, the speed of extraction slows down. The more complicated the shapes become, the more time it takes to extract the via capacitance. Therefore, in order to speed up the processing time, the number of shapes, and the complexity of the shapes should be reduced as much as possible when the reductions in number and complexity do not alter the accuracy of the via capacitance extraction.

Figure 2A:
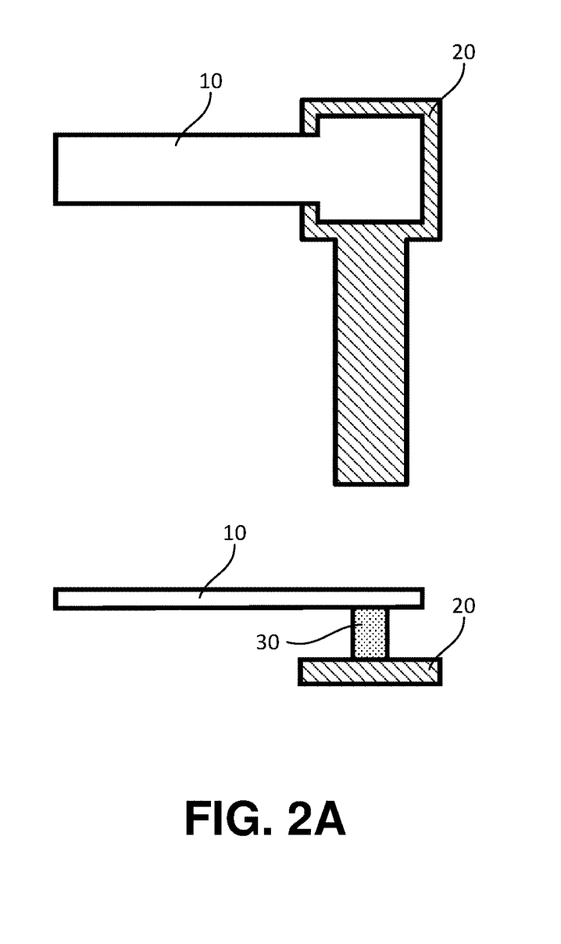
FIG. 2A shows original shapes of a via pad having a first via pad and a second via pad.
Figure 2B:
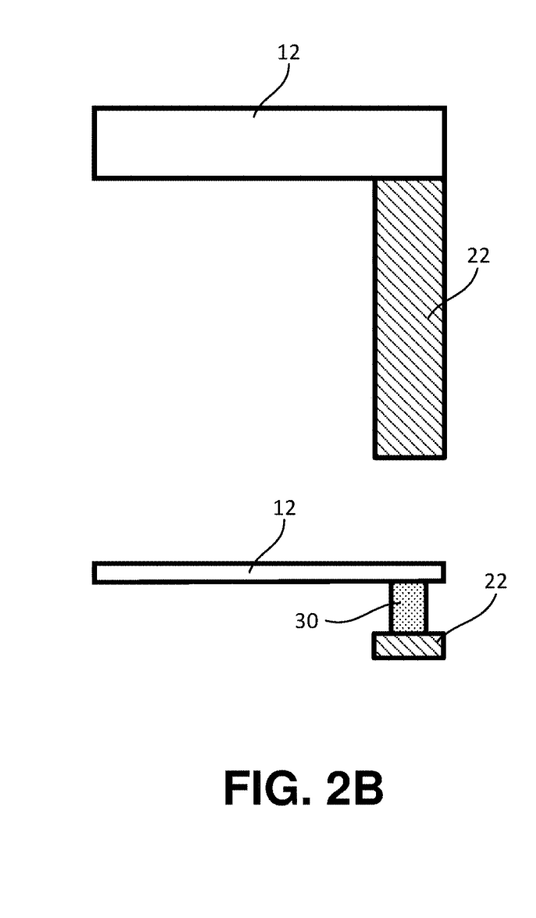
FIG. 2B shows a simplified shapes of the via pads for extracting via capacitance in accordance with one exemplary embodiment.
Figure 3A:
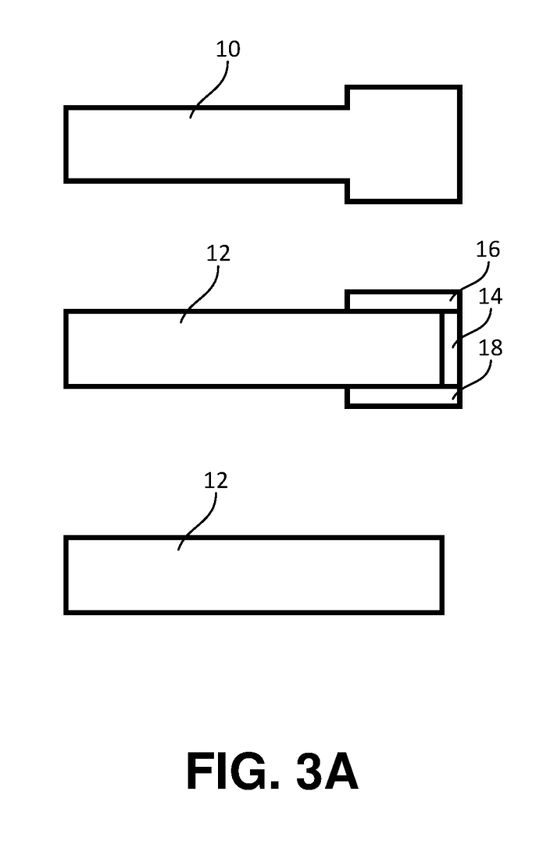
FIG. 3A shows removal of overhangs of the first via pad and FIG. 3B shows removal of overhangs of the second via pad for extracting via capacitance in accordance with the exemplary embodiment.
Figure 3B:
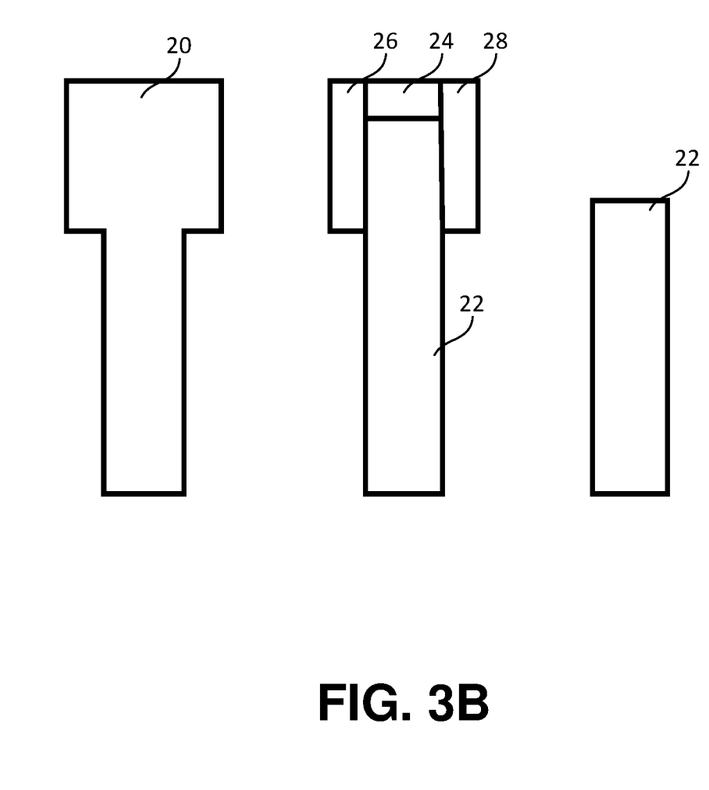

In FIG. 2A, a top view and a side view of an interconnect (net) are shown according to one exemplary embodiment of the present disclosure. A first via pad 10 and a second via pad 20 are shown in the top view, and a via 30 is shown in the sideview of the net connecting the first via pad 10 and the second via pad 20. According to original design, the first via pad 10 and the second via pad 20 are formed in a rectangular shape and a square shape as shown in FIG. 3A and FIG. 3B. The first via pad 10, and the second via pad 20 can be decomposed into several different rectangular shapes. For example, the first via pad 10 can be decomposed into four smaller rectangular shapes 12, 14, 16, and 18. The second via pad 20 can be decomposed into four smaller rectangular shapes 22, 24, 26, and 28. The shapes 14, 16, and 18 are considered as overhangs. It is observed that these overhangs increase tile fracturing count, when unioning the shapes of a target net into non-overlapping tiles. These overhangs are often relatively small and contribute very little to the overall topology for the routed net. Therefore, during the shape processing operation shown in block 102, and 104, the processing operation includes excluding these overhangs when computing the target tiles. The via pad shape is a candidate for pruning only when the corresponding via cut shapes are otherwise covered by routing overlap. In order to maintain a conservative total distributed capacitance, during pruning phase, the tiles representing the pruned via pad shape are preserved. The examples shown in FIG. 2B illustrates the equivalent via shape after the pruning. The overhangs 14, 16, and 18 are removed for the first via pad 10 to become first pruned via pad 12, and the overhangs 24, 26, and 28 are removed for the second via pad 20 to become second pruned via pad 22. From this example, the total number of rectangular shapes to be considered is reduced from 8 to 2. These two pruned via pads 12, and 22 are used for via capacitance extraction instead of the original first via pad 10 and second via pad 20. The complexity of each of the via pad shapes are also reduced from rectangular shape plus a square shape to just one non-overlapped rectangular shape.

Figure 4A:
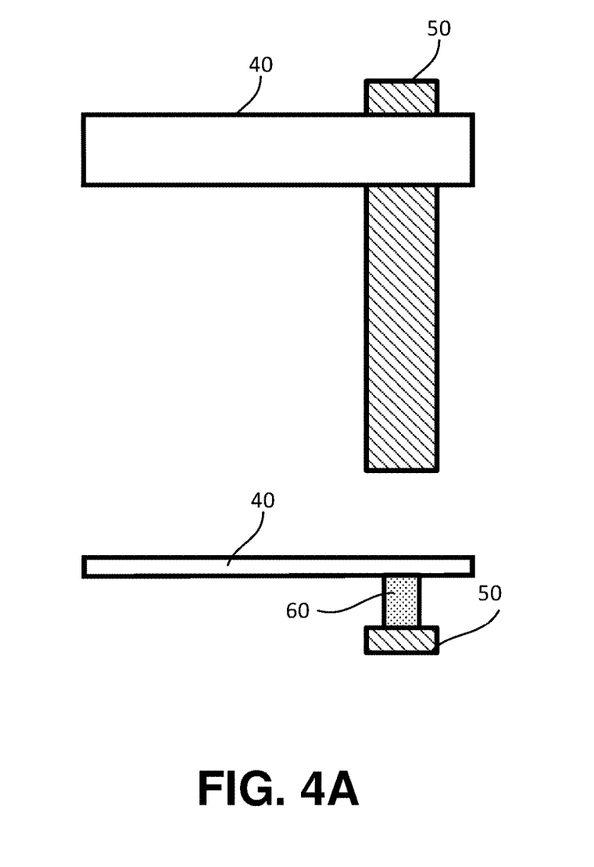
FIG. 4A shows original shapes of a via pad having a first via pad and a second via pad.
Figure 4B:
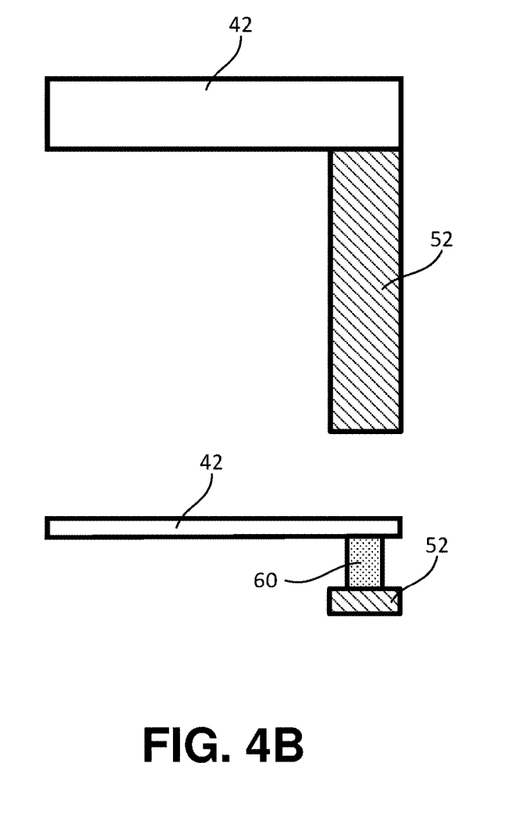
FIG. 4B shows a simplified shapes of the via pads for extracting via capacitance in accordance with another exemplary embodiment.
Figure 5A:
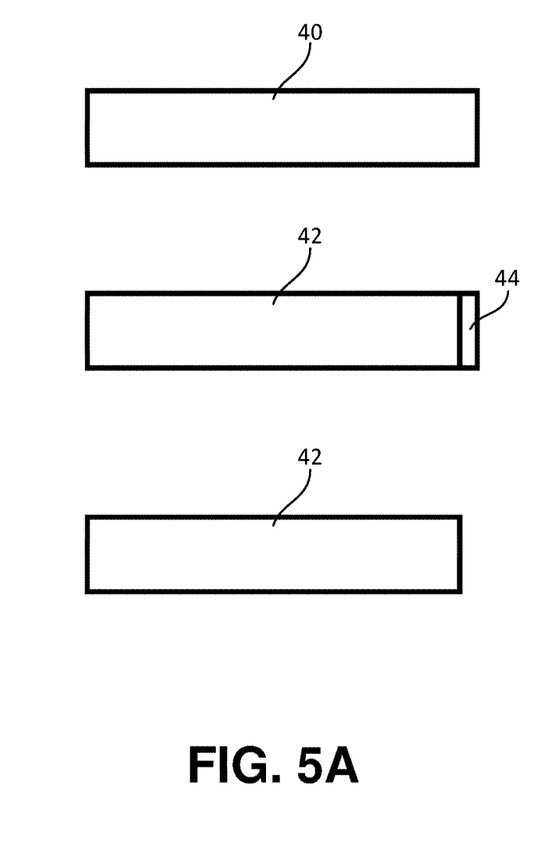
FIG. 5A shows removal of overhangs of the first via pad and FIG. 5B shows removal of overhangs of the second via pad for extracting via capacitance in accordance with another exemplary embodiment.
Figure 5B:
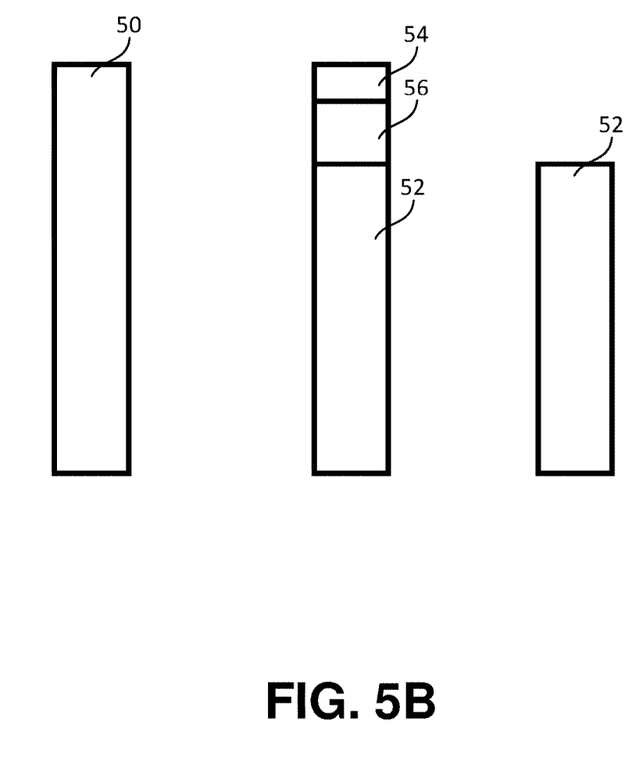

In FIG. 4A, a top view and a side view of an interconnect (net) are shown according to another exemplary embodiment of the present disclosure. A first via pad 40 and a second via pad 50 are shown in the top view, and a via 60 is shown in the sideview of the net connecting the first via pad 40 and the second via pad 50. According to original design, the first via pad 40 and the second via pad 50 are formed in a rectangular shape and a square shape as shown in FIG. 5A and FIG. 5B. Each of the first via pad 40, and the second via pad 50 can be decomposed into at least two different rectangular shapes. For example, the first via pad 40 can be decomposed into a shorter rectangular shape 42, and another rectangular overhang 44. The second via pad 50 can be decomposed into a shorter rectangular shape 52, and another rectangular overhang 54, and a square overlapped overhang 56. The shapes 44 and 54 are considered as overhangs. These overhangs and overlapped overhang are often relatively small and contribute very little to the overall topology for the routed net. Therefore, during the shape processing operation shown in block 102, and 104, the processing operation includes excluding these overhangs 44, 54, and 56 when computing the target tiles. The examples shown in FIG. 4B illustrates the equivalent via shape after the pruning. The overhangs 44 is removed for the first via pad 40 to become first pruned via pad 42, and the overhangs 54, and 56 are removed for the second via pad 50 to become second pruned via pad 52. From this example, the total number of rectangular shapes to be considered is reduced from 5 to 2. These two pruned via pads 42, and 52 are used for via capacitance extraction instead of the original first via pad 40 and second via pad 50. The complexity of each of the via pad shapes are also reduced from two rectangular shapes to just one non-overlapped rectangular shape.

In another aspect, the present disclosure relates to a processing system for extracting via capacitance. In exemplary embodiments, the processing system includes a processor in communication with one or more types of memory. The processor is configured to: place various shapes of target nets of an IC into a Cshapes collection and place various via pad shapes of the target nets into a CshapesVia collection, process the shapes in the Cshapes collection and place the processed shapes into a Ctile collection, and process the via pad shapes in the CshapesVia collection and place the processed shapes into a CtilesVia collection, and extract via capacitance of the target nets through each of the Cshapes collection, the CshapesVia collection, the Ctiles collection, and the CtilesVia collection.

In yet another aspect, the present invention relates to a computer program product for extracting via capacitance. In certain embodiments, the computer program product includes a non-transitory storage medium readable by a processing circuit and storing computer executable instructions for execution by the processing circuit for performing a method of extracting via capacitance. The method includes: placing various shapes of target nets of an IC into a Cshapes collection and placing various via pad shapes of the target nets into a CshapesVia collection, processing the shapes in the Cshapes collection and placing the processed shapes into a Ctile collection, and processing the via pad shapes in the CshapesVia collection and placing the processed shapes into a CtilesVia collection, and extracting via capacitance of the plurality of target nets through each of the Cshapes collection, the CshapesVia collection, the Ctiles collection, and the CtilesVia collection.

As it is disclosed earlier, the performance of the extraction tool is a function of the number of shapes making up the wires, and of their proximity and electrical interaction with other shapes in the neighborhood. As large number of shapes are processed prior to the via capacitance extraction, more shapes are simplified, more overhangs and overlapped shapes are removed, and more shapes are unionized, the total number of shapes are greatly reduced, therefore the time spend for the via capacitance extraction are greatly reduced. According to one exemplary experiment, the computation time is reduced about 25% when certain aspects of the methods disclosed herein are used, comparing to more traditional via capacitance extraction methods.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for via capacitance extraction, the method comprising:
   placing a plurality of shapes of target nets of an integrated circuit (IC) into a Cshapes collection and placing a plurality of via pad shapes of the target nets into a CshapesVia collection, wherein each of the via pads has a first via pad shape, and a second via pad shape;
   processing the plurality of shapes in the Cshapes collection and placing the processed shapes into a Ctile collection, and processing the plurality of via pad shapes in the CshapesVia collection and placing the processed shapes into a CtilesVia collection;
   extracting via capacitance of the plurality of target nets through each of the Cshapes collection, the CshapesVia collection, the Ctiles collection, and the CtilesVia collection; and
   fabricating the integrated circuit.

2. The computer-implemented method of claim 1, wherein the processing operation comprises:
   excluding each of the second via pad shape of the plurality of via pad shapes from the Cshapes collection when the via's cut shapes are already covered by the target nets; and
   adding the excluded second via pad shape into the CshapesVia collection.

3. The computer-implemented method of claim 1, wherein the processing operation comprises simplifying the plurality of shapes in the Cshapes collection and the plurality of via pad shapes in the CshapesVia collection, respectively.

4. The computer-implemented method of claim 3, wherein the simplifying operation comprises:
   reducing the complexity of the plurality of shapes in the Cshapes collection and the CshapesVia collection;
   removing a plurality of shapes that will not contribute the results of via capacitance from the Cshapes collection and the CshapesVia collection; and
   unioning the plurality of shapes in the C shapes collection and the CshapesVia collection, respectively.

5. The computer-implemented method of claim 4, wherein the removing operation comprises removing a plurality of overhang shapes and a plurality of overlapped shapes from the Cshapes collection and the CshapesVia collection, respectively.

6. The computer-implemented method of claim 4, wherein the unioning operation comprises:
   unioning the plurality of shapes from the C shapes collection into a non-overlapping Ctiles collection;
   unioning the plurality of shapes from the CshapesVia collection into a non-overlapping CtileVia collection;
   computing the tile intersections of the Cshapes collection and the CshapesVia collection; and
   removing the intersections from the CshapesVia collection.

7. The computer-implemented method of claim 1, wherein the extracting operation comprises:
   extracting via capacitance from each of the plurality of shapes in the Cshapes collection, the CshapesVia collection, and the Ctiles collection;
   performing a fast 2D via capacitance extraction for each tile in the CtilesVia collection; and
   adding the extracted capacitance to the corresponding tile capacitance in Ctiles collection.

8. A computer program product for via capacitance extraction, the computer program product comprising:
   a non-transitory storage medium readable by a processing circuit and storing instructions for execution by the processing circuit for performing a method comprising:
   placing a plurality of shapes of target nets of an integrated circuit into a Cshapes collection and placing a plurality of via pad shapes of the target nets into a CshapesVia collection, wherein each of the via pads has a first via pad shape, and a second via pad shape;
   processing the plurality of shapes in the Cshapes collection and placing the processed shapes into a Ctile collection, and processing the plurality of via pad shapes in the CshapesVia collection and placing the processed shapes into a CtilesVia collection;
   extracting via capacitance of the plurality of target nets through each of the Cshapes collection, the CshapesVia collection, the Ctiles collection, and the CtilesVia collection; and
   fabricating the integrated circuit.

9. The computer program product of claim 8, wherein the processing operation comprises:
   excluding each of the second via pad shape of the plurality of via pad shapes from the Cshapes collection when the via's cut shapes are already covered by the target nets; and
   adding the excluded second via pad shape into the CshapesVia collection.

10. The computer program product of claim 8, wherein the processing operation comprises simplifying the plurality of shapes in the Cshapes collection and the plurality of via pad shapes in the CshapesVia collection, respectively.

11. The computer program product of claim 10, wherein the simplifying operation comprises:
    reducing the complexity of the plurality of shapes in the Cshapes collection and the CshapesVia collection;
    removing a plurality of shapes that will not contribute the results of via capacitance from the Cshapes collection and the CshapesVia collection; and
    unioning the plurality of shapes in the C shapes collection and the CshapesVia collection, respectively.

12. The computer program product of claim 11, wherein the removing operation comprises removing a plurality of overhang shapes and a plurality of overlapped shapes from the Cshapes collection and the CshapesVia collection, respectively.

13. The computer program product of claim 11, wherein the unioning operation comprises:
    unioning the plurality of shapes from the C shapes collection into a non-overlapping Ctiles collection;
    unioning the plurality of shapes from the CshapesVia collection into a non-overlapping CtileVia collection;
    computing the tile intersections of the Cshapes collection and the CshapesVia collection; and
    removing the intersections from the CshapesVia collection.

14. The computer program product of claim 8, wherein the extracting operation comprises:
    extracting via capacitance from each of the plurality of shapes in the Cshapes collection, the CshapesVia collection, and the Ctiles collection;
    performing a fast 2D via capacitance extraction for each tile in the CtilesVia collection; and
    adding the extracted capacitance to the corresponding tile capacitance in Ctiles collection.

15. A processing system for via capacitance extraction, comprising:
    a processor in communication with one or more types of memory, the processor configured to:
    place a plurality of shapes of target nets of an integrated circuit into a Cshapes collection and place a plurality of via pad shapes of the target nets into a CshapesVia collection, wherein each of the via pads has a first via pad shape, and a second via pad shape;
    process the plurality of shapes in the Cshapes collection and place the processed shapes into a Ctile collection, and process the plurality of via pad shapes in the CshapesVia collection and place the processed shapes into a CtilesVia collection, respectively;
    extract via capacitance of the plurality of target nets through each of the Cshapes collection, the CshapesVia collection, the Ctiles collection, and the CtilesVia collection; and
    fabricating the integrated circuit.

16. The processing system method of claim 15, wherein the processor is configured to:
    exclude each of the second via pad shape of the plurality of via pad shapes from the Cshapes collection when the via's cut shapes are already covered by the target nets; and
    add the excluded second via pad shape into the CshapesVia collection.

17. The processing system method of claim 15, wherein the processor is further configured to simplify the plurality of shapes in the Cshapes collection and the plurality of via pad shapes in the CshapesVia collection, respectively.

18. The processing system method of claim 17, wherein the processor is further configured to:
    reduce the complexity of the plurality of shapes in the Cshapes collection and the CshapesVia collection, respectively;
    remove a plurality of overhang shapes and a plurality of overlapped shapes from the Cshapes collection and the CshapesVia collection, respectively; and
    union the plurality of shapes in the Cshapes collection and the CshapesVia collection, respectively.

19. The processing system method of claim 17, wherein the processor is further configured to:
    union the plurality of shapes from the Cshapes collection into a non-overlapping Ctiles collection;

union the plurality of shapes from the CshapesVia collection into a non-overlapping CtileVia collection;
compute the tile intersections of the Cshapes collection and the CshapesVia collection; and
remove the intersections from the CshapesVia collection.

20. The processing system method of claim 15, wherein the processor is further configured to:
extracting via capacitance from each of the plurality of shapes in the Cshapes collection, the CshapesVia collection, and the Ctiles collection;
performing a fast 2D via capacitance extraction for each tile in the CtilesVia collection; and
adding the extracted capacitance to the corresponding tile capacitance in Ctiles collection.

* * * * *